(12) United States Patent
Seeds et al.

(10) Patent No.: US 7,585,032 B2
(45) Date of Patent: Sep. 8, 2009

(54) MODULAR AXLE ASSEMBLY

(75) Inventors: Harold W. Seeds, Lake Orion, MI (US); David M. Morse, Waterford, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 920 days.

(21) Appl. No.: 10/792,661

(22) Filed: Mar. 3, 2004

(65) Prior Publication Data

US 2005/0082780 A1 Apr. 21, 2005

Related U.S. Application Data

(60) Provisional application No. 60/512,232, filed on Oct. 17, 2003.

(51) Int. Cl.
*B60B 35/00* (2006.01)
(52) U.S. Cl. .................................... 301/124.1; 180/905
(58) Field of Classification Search ................ 180/905, 180/906; 301/124.1, 131, 137; 74/607
See application file for complete search history.

(56) References Cited

U.S. PATENT DOCUMENTS

| 1,732,825 | A | * | 10/1929 | Wilson, Sr. ................. 295/39 |
|---|---|---|---|---|
| 2,570,191 | A | | 10/1951 | Beckwith |
| 2,911,262 | A | | 11/1959 | Franckj |
| 3,037,818 | A | | 6/1962 | Scheel |
| 4,168,086 | A | * | 9/1979 | Dick et al. ................ 280/124.1 |
| 4,284,158 | A | | 8/1981 | Schield |
| 4,815,338 | A | * | 3/1989 | Holan et al. ............... 74/665 T |
| 5,070,745 | A | * | 12/1991 | Lindsey et al. .......... 74/665 GB |
| 5,105,517 | A | | 4/1992 | Barnow |
| 5,429,423 | A | | 7/1995 | Pollock et al. |
| 5,664,847 | A | * | 9/1997 | Bear et al. .................. 301/137 |
| 5,810,377 | A | | 9/1998 | Keeler et al. |
| 6,024,418 | A | | 2/2000 | Ebert |
| 6,253,989 | B1 | * | 7/2001 | Bennett ....................... 228/135 |
| 6,439,672 | B1 | | 8/2002 | Simon |
| 6,533,697 | B2 | * | 3/2003 | Morse et al. ................ 475/230 |

* cited by examiner

*Primary Examiner*—Faye M. Fleming
(74) *Attorney, Agent, or Firm*—Harness, Dickey & Pierce, P.L.C.

(57) ABSTRACT

A modular axle assembly includes a first tube assembly and a second tube assembly interconnected by a center section. A number of different modular axle assemblies are constructed by using different center sections. For example, a non-driving axle includes a sleeve interconnecting first and second tube assemblies. A driving front axle includes a differential housing interconnecting the first and second tube assemblies.

21 Claims, 4 Drawing Sheets

US 7,585,032 B2

MODULAR AXLE ASSEMBLY

This application claims the benefit of U.S. Provisional Application No. 60/512,232 filed on Oct. 17, 2003. The disclosure of the provisional application is incorporated herein by reference.

BACKGROUND OF THE INVENTION

The present invention relates generally to axle assemblies for motor vehicles and, more particularly, to a family of modular axle assemblies which include a majority of common components.

In view of an increased demand for vehicles having all wheel drive systems, many manufacturers are currently offering vehicles equipped with an optional four-wheel drive system. Typically, a two-wheel drive vehicle includes a non-driving axle assembly which differs greatly from the driving axle assembly used in a similar four-wheel drive vehicle. Not only does the driving axle include the additional requisite power transmission components, but the axle housing itself is also typically very different. Because the non-driving and driving axle assemblies have similar but different components, the cost associated with providing both two-wheel drive and four-wheel drive vehicles may become prohibitive. Specifically, design, prototype and testing programs are required to evaluate each design. In addition, the different axle assemblies often require dedicated tools and manufacturing process steps which are individual to each type of assembly. Unfortunately, the cost of creating and using multiple sets of fixtures and tooling is very high.

While the present method of providing driving and non-driving axle assemblies is functional, a need exists to reduce the complexity and cost of offering two-wheel drive and four-wheel drive vehicles.

SUMMARY OF THE INVENTION

Thus, is it an object of the present invention to provide a modular axle assembly which may be configured to provide a non-driving front axle or a driving front axle using a large number of common components.

It is another object of the present invention to construct the modular axle assembly to include a number of standardized components to cooperate with certain interchangeable components which are unique to non-driving or driving axle assemblies.

It is another object of the present invention to provide a modular axle assembly having common axle tube and wheel end assemblies with a replaceable modular center section.

It is another object of the present invention to provide a non-driving modular axle assembly having a cast sleeve including an integral jounce pad.

The present invention includes a modular axle assembly having a first tube assembly and a second tube assembly interconnected by a center section. A number of different modular axle assemblies are constructed by using different center sections. For example, a non-driving axle includes a sleeve interconnecting first and second tube assemblies. A driving front axle includes a differential housing interconnecting the first and second tube assemblies.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
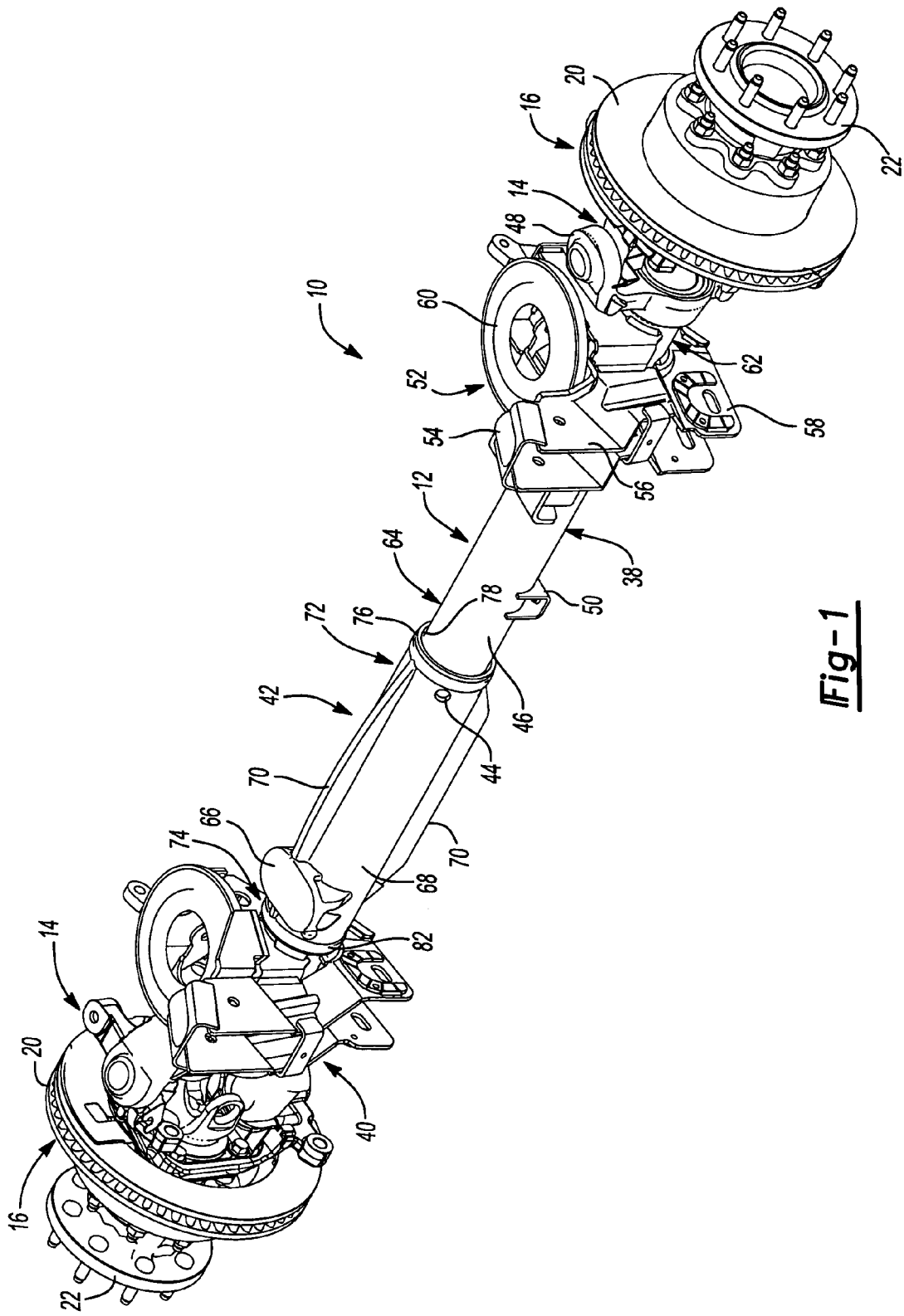
FIG. 1 is a perspective view of a modular non-driving front axle constructed in accordance with the teachings of the present invention.
Figure 2:
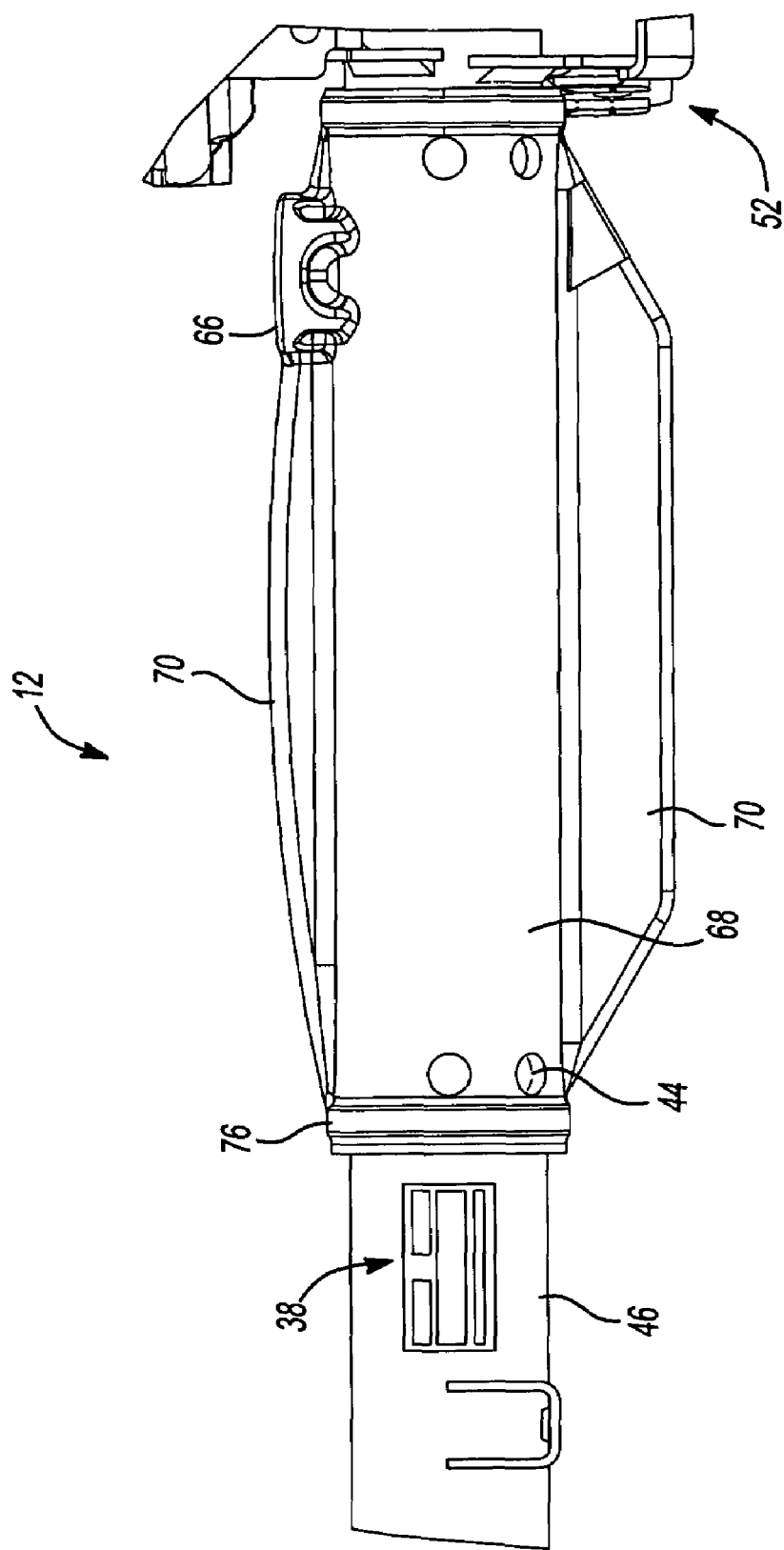
FIG. 2 is a fragmentary front view of the modular non-driving front axle of FIG. 1.

With reference to FIGS. 1 and 2, a modular axle assembly 10 constructed in the form of non-driving front axle is depicted. Non-driving axle 10 includes a sleeve and tube assembly 12, a pair of knuckle assemblies 14 and a pair of wheel end assemblies 16. Non-driving axle 10 functions to support a portion of the vehicle load and provide articulating wheel end assemblies for steering.

The pair of knuckle assemblies 14 and the pair of wheel end assemblies 26 are common to both the driving and non-driving versions of the modular axle assembly of the present invention. As such, reference to FIG. 4 should also be made. Each wheel end assembly 16 includes a hub 18, a brake rotor 20, a hub extension 22 and an outer shaft 24. Each of these components are free to rotate about the longitudinal axis of outer shaft 24. A hub nut 26 couples outer shaft 24 to hub 18. Various fasteners and seals that are not specifically identified complete wheel end assembly 16.

Each knuckle assembly 14 includes a steering knuckle 28 and a brake caliper 30. Knuckle assembly 14 is pivotally coupled to sleeve and tube assembly 12 by an upper ball joint 32 and a lower ball joint 34. Brake caliper 30 includes a pair of brake pads 36 positioned on each side of brake rotor 20.

Sleeve and tube assembly 12 includes a first tube assembly 38 and a second tube assembly 40 interconnected by a sleeve 42. First tube assembly 38 and second tube assembly 40 may be fixed to sleeve 42 using a number of manufacturing techniques. Preferably, the first and second tube assemblies are press-fit to sleeve 42. Alternatively, and/or additionally, the first and second tube assemblies may be welded or otherwise mechanically fastened to sleeve 42. Specifically contemplated processes include puddle welding, slug welding and riveting.

To puddle weld, a series of radially extending apertures 44 are formed in sleeve 42. Apertures 44 are at least partially filled with a meltable weld material. A current is passed through the tube assembly and the sleeve which causes the weld material to melt. Upon cooling, the weld material adheres to both the tube assembly and the sleeve.

First tube assembly 38 is substantially similar to second tube assembly 40. Accordingly, only first tube assembly 38 will be described in detail. First tube assembly 38 includes a tube 46, a yoke 48, a jounce pad 50 and a number of brackets 52 useful for interconnecting sleeve and tube assembly 12 with a number of vehicle suspension components. Specifically, brackets 52 include a roll stop 54, an upper control arm bracket 56, a lower control arm bracket 58, and a spring seat 60. Tube 46 includes a first end 62 and a second end 64. First end 62 is coupled to yoke 48. Second end 64 may be coupled to sleeve 42 as previously described or to a differential axle housing as will be described in greater detail hereinafter. Each of brackets 52 and jounce pad 50 are preferably constructed from stamped steel sheets and formed to a desired shape. The formed stampings are then welded to tube 46. Similarly, yoke 48 is preferably welded to tube 46. Alternate processes such as press-fitting, adhesive bonding or installation of mechanical fasteners are also contemplated.

Sleeve 42 is preferably a cast component requiring little or no machining prior to assembly to the first and second tube assemblies. Alternatively, sleeve 42 may be formed from tubing with brackets welded to the tube as required. In the cast embodiment shown in FIGS. 1 and 2, sleeve 42 includes integrally cast features such as a jounce pad 66 to alleviate the need for subsequent bracket welding. Sleeve 42 also includes a substantially cylindrical body 68 and a plurality of ribs 70 longitudinally extending along body 68. Body 68 includes a first end 72 and a second end 74. First end 72 has a collar 76 with an inner cylindrical surface 78 sized to engage an outer surface of tube 46. Second end 74 includes a similar collar 82 having an inner surface in engagement with an outer surface of the tube from second tube assembly 40. Sleeve 42 has an overall length which is substantially the same as the overall length of the differential housing of the driving axle depicted in FIG. 3. By constructing sleeve 42 in this manner, non-driving axle assemblies and driving axle assemblies having the same wheel to wheel spacing may be easily constructed.

Figure 3:
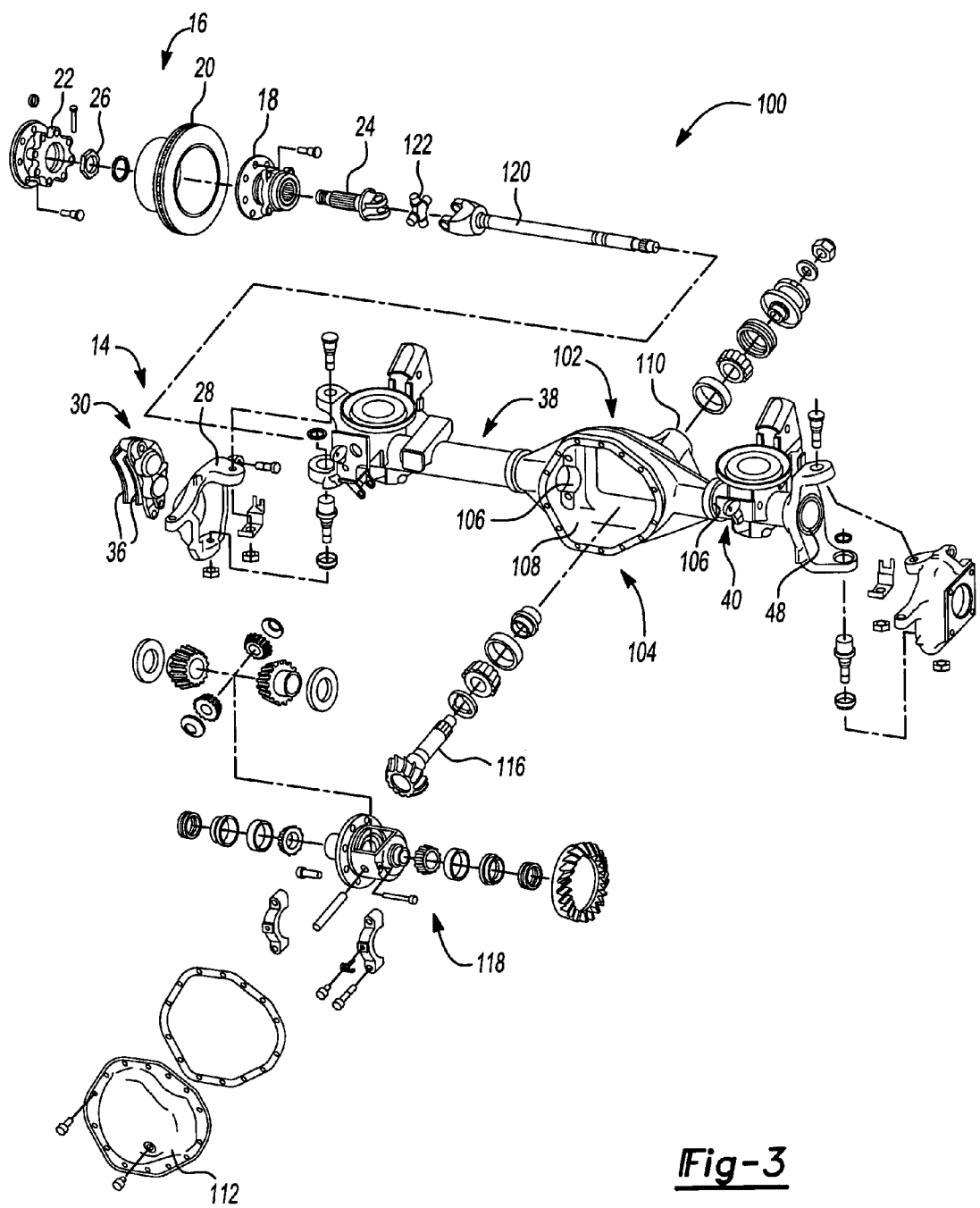
FIG. 3 is a perspective view of a modular driving axle assembly constructed in accordance with the teachings of the present invention.
Figure 4:
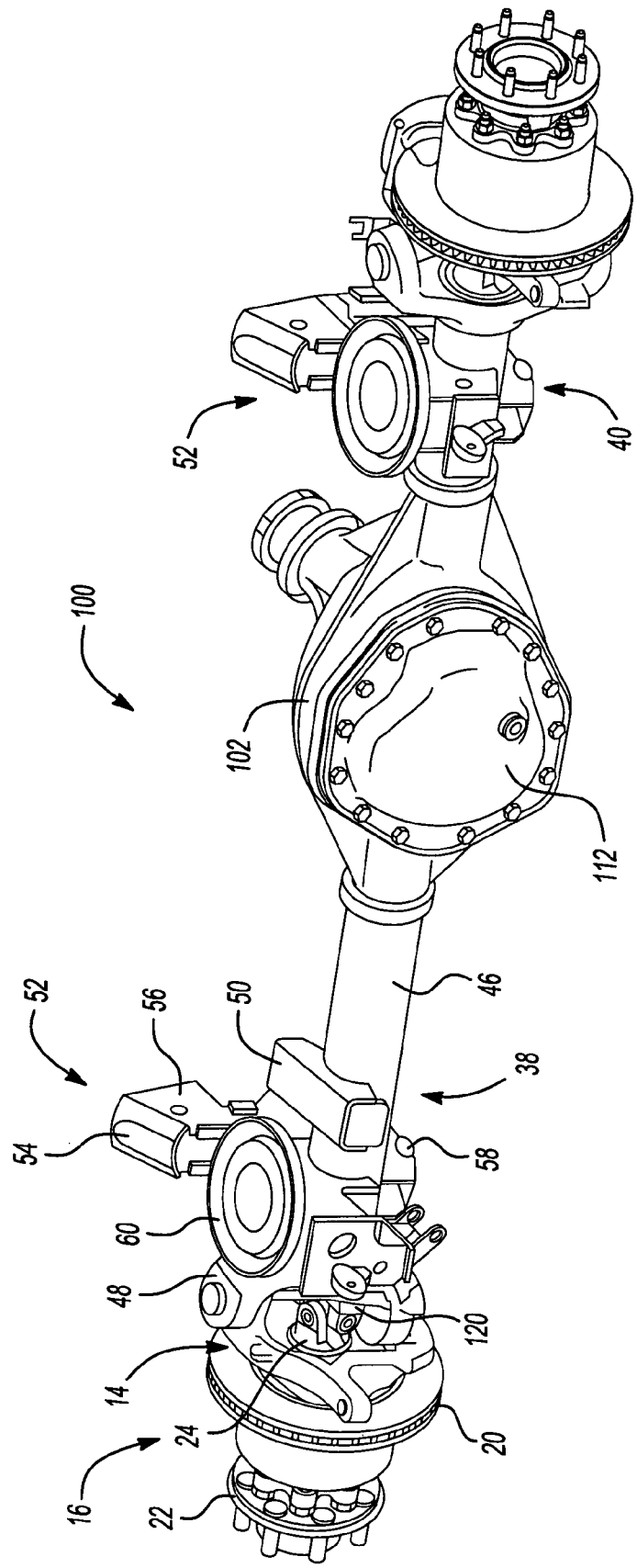
FIG. 4 is an exploded perspective view of the modular driving front axle shown in FIG. 3.

FIGS. 3 and 4 depict a modular axle assembly constructed as a driving axle 100. Driving axle 100 includes common knuckle assemblies 14, wheel end assemblies 16, first tube assembly 38 and second tube assembly 40. First tube assembly 38 and second tube assembly 40 are joined to a differential housing 102 to form a sleeve and housing assembly 104. Differential housing 102 includes a pair of axially aligned apertures 106 for receipt of first tube assembly 38 and second tube assembly 40. The first and second tube assemblies are coupled to differential housing 102 using the press-fitting, plug welding and/or mechanical fastening techniques previously described in relation to sleeve 42. It should be appreciated that because of the large number of common components and the common position of the components of the driving and non-driving axles, one set of tooling may likely be used to couple the first and second tube assemblies to the sleeve and/or the differential housing.

Differential housing 102 also includes an access opening 108 and an input shaft aperture 110. A cover 112 encloses access opening 108 after certain driveline components, introduced hereinafter, have been assembled with a cavity 114 defined by differential housing 102. Power is transferred to the wheels of driving axle 100 via an input shaft 116, a differential assembly 118 and drive shafts 120. For clarity, only one of driveshaft 120 is depicted in the Figure. Driveshaft 120 is drivingly coupled to outer shaft 24 by a universal joint 122.

From the foregoing discussion, it should be appreciated that a family of axle assemblies may be constructed using the modular concept described. Utilization of common axle tube assemblies and wheel end assemblies in driving and non-driving axles allows for manufacturing and assembly cost reductions. Furthermore, the costs associated with testing and verification of two entirely different axle assemblies are avoided.

The previous sections disclose and describe merely exemplary embodiments of the present invention. One skilled in the art will readily recognize from the discussion, and from the accompanying drawings and claims, that various changes, modifications and variations may be made therein without department from the spirit and scope of the invention as defined in the following claims.

What is claimed is:

1. A modular axle assembly comprising:
    a first assembly adapted to rotatably support a first wheel;
    a second assembly adapted to rotatably support a second wheel; and
    a center section kit including a sleeve and a differential housing, one member of said center section kit interconnecting said first and second assemblies, said sleeve and said differential housing each having two axially aligned apertures for receipt of said first and second assemblies, wherein said first assembly includes a substantially cylindrical tube coupled to a yoke.

2. The modular axle assembly of claim 1 wherein said tube includes an end opposite said yoke, said end being positioned within one of said axially aligned apertures.

3. The modular axle assembly of claim 2 wherein an outer surface of said tube is frictionally engaged with said center section.

4. The modular axle assembly of claim 2 further including a knuckle pivotally coupled to said yoke, said first wheel being coupled to said knuckle to provide a steering angle to said first wheel.

5. The modular axle assembly of claim 1 wherein at least one of said first and second assemblies includes a spring seat.

6. The modular axle assembly of claim 1 further including first and second axle shafts when said center section is a differential housing, said first axle shaft drivingly interconnecting a differential gear set and said first wheel, said second axle shaft drivingly interconnecting said differential gear set and said second wheel.

7. A modular axle assembly comprising:
    a first assembly adapted to rotatably support a first wheel;
    a second assembly adapted to rotatably support a second wheel;
    a center section interconnecting said first and second assemblies, wherein said center section is selected from a group consisting of a sleeve and a differential housing, said sleeve and said differential housing each having two axially aligned apertures for receipt of said first and second assemblies, wherein said first assembly includes a substantially cylindrical tube coupled to a yoke; and
    first and second axle shafts when said center section is a differential housing, said first axle drivingly interconnecting a differential gear set and said first wheel, said second axle shaft drivingly interconnecting said differential gear set and said second wheel, wherein said first axle shaft is rotatably supported by said first assembly.

8. The modular axle assembly of claim 7 wherein said first wheel is pivotable to allow steering of said first wheel.

9. The modular axle assembly of claim 1 wherein said sleeve includes a substantially constant diameter.

10. The modular axle assembly of claim 1 further including a differential gear rotatably supported within said differential housing, said differential gear being drivingly coupled to said first wheel.

11. The modular axle assembly of claim 1 wherein said sleeve and said differential housing have substantially equal lengths.

12. A modular axle assembly comprising:
   a first assembly adapted to rotatably support a first wheel;
   a second assembly adapted to rotatably support a second wheel; and
   a center section kit including a sleeve and a differential housing, said modular axle assembly having a first configuration including said sleeve interconnecting said first and second assemblies, said modular assembly having a second configuration different than the first configuration including said differential housing interconnecting said first and second assemblies, said sleeve and said differential housing each having two axially aligned apertures for receipt of said first and second assemblies.

13. The modular axle assembly of claim 12 wherein said sleeve includes a substantially constant diameter along its length.

14. The modular axle assembly of claim 13 wherein said sleeve includes an integrally formed jounce pad.

15. The modular axle assembly of claim 14 wherein said sleeve includes a longitudinally extending rib formed on an outer surface of said sleeve intersecting said jounce pad.

16. The modular axle assembly of claim 12 further including first and second axle shafts when said center section is a differential housing, said first axle shaft drivingly interconnecting a differential gear set and said first wheel, said second axle shaft drivingly interconnecting said differential gear set and said second wheel.

17. The modular axle assembly of claim 12 wherein a puddle weld interconnects said first assembly and said center section.

18. A modular axle assembly kit, comprising:
   a first assembly adapted to rotatably support a first wheel;
   a second assembly adapted to rotatably support a second wheel; and
   a center section kit including a sleeve and a differential housing, only one of said sleeve and said differential housing comprising a portion of a modular axle assembly, said sleeve and said differential housing each having two axially aligned apertures in receipt of said first and second assemblies when interconnecting the first and second assemblies.

19. The modular axle assembly kit of claim 18 further including first and second driveshafts when said center section is said differential housing wherein said first driveshaft interconnects a differential gearset to said first wheel and said second driveshaft interconnects said differential gearset to said second wheel.

20. The modular axle assembly of claim 18 wherein said sleeve includes an integrally formed jounce pad.

21. The modular axle assembly of claim 20 wherein said sleeve includes a longitudinally extending rib formed on an outer surface of said sleeve intersecting said jounce pad.

\* \* \* \* \*

UNITED STATES PATENT AND TRADEMARK OFFICE
CERTIFICATE OF CORRECTION

PATENT NO. : 7,585,032 B2
APPLICATION NO. : 10/792661
DATED : September 8, 2009
INVENTOR(S) : Seeds et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1445 days.

Signed and Sealed this

Fourteenth Day of September, 2010

David J. Kappos
*Director of the United States Patent and Trademark Office*